No. 768,860. PATENTED AUG. 30, 1904.
O. L. LEACH.
TIRE.
APPLICATION FILED AUG. 6, 1903.
NO MODEL.
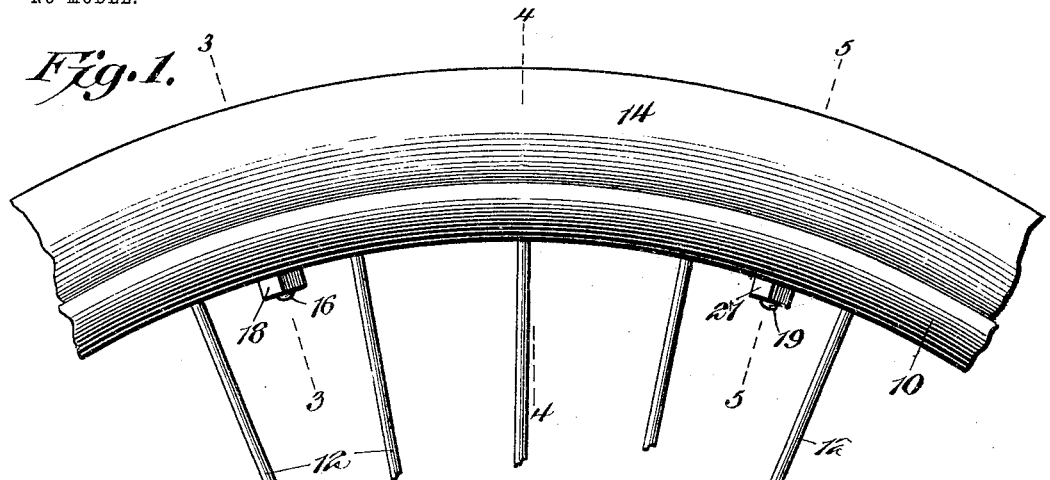
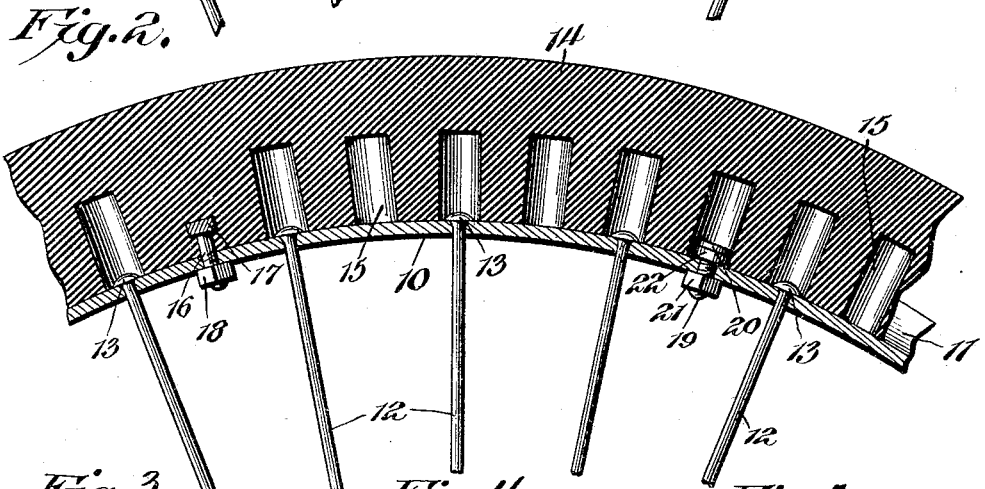
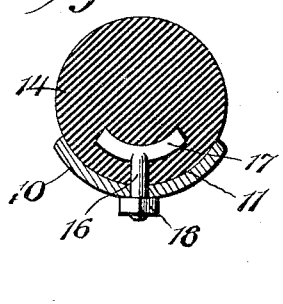 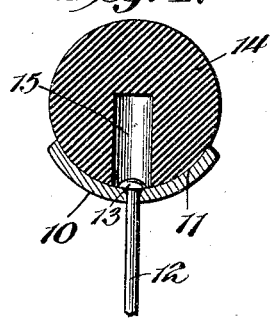 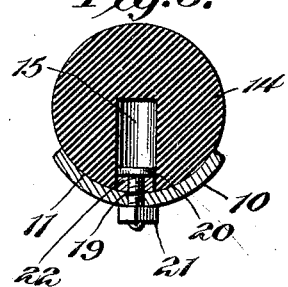
Orville L. Leach, Inventor,
Witnesses No. 768,860.

Patented August 30, 1904.

UNITED STATES PATENT OFFICE.

ORVILLE LIVINGSTON LEACH, OF ELMWOOD, RHODE ISLAND.

TIRE.

SPECIFICATION forming part of Letters Patent No. 768,860, dated August 30, 1904.

Application filed August 6, 1903. Serial No. 168,524. (No model.)

*To all whom it may concern:*

Be it known that I, ORVILLE LIVINGSTON LEACH, a citizen of the United States, residing at Elmwood, in the county of Providence and State of Rhode Island, have invented a new and useful Tire, of which the following is a specification.

This invention relates more particularly to vehicle-tires of that type known as "cushion-tires;" and the object of the invention is to provide a structure which can be readily and cheaply manufactured, easily applied to a wheel, and when in place will not become accidentally displaced through any of the usual strains to which such tires are ordinarily subjected.

The preferred form of construction is illustrated in the accompanying drawings, wherein—

Figure 1 is a side elevation of a portion of a wheel, showing the tire applied thereto. Fig. 2 is a longitudinal sectional view through the same. Figs. 3, 4, and 5 are cross-sectional views taken, respectively, on the lines 3 3, 4 4, and 5 5 of Fig. 1.

Similar reference-numerals indicate corresponding parts in all the figures of the drawings.

In the embodiment illustrated a ring 10 is employed, preferably formed of sheet metal and dished to provide a longitudinal channel 11. To this rim are attached the outer ends of radial spokes 12, that pass through said rim and have their outer ends headed down, as shown at 13, upon the outer face of the bottom of the channel. Upon the rim thus constructed is placed the tire 14. This tire is made of elastic material, preferably rubber, and molded in one integral piece. It is preferably somewhat smaller than the rim, but is seated in the channel by being stretched when fitted to place. It will thus bind tightly upon the rim and will not ordinarily become displaced. The tire is provided with radially-disposed air-sockets 15, which extend into the same from the inner face and terminate short of the outer face, said sockets being cylindrical in form and of less diameter than the diameter of the tire. Therefore when the tire is in place on the rim the inner ends of the sockets are tightly covered and sealed by the rim, so that the air contained therein cannot readily escape. The heads 13 of the spokes are arranged to engage in certain of the sockets, and thus do not interfere with the proper fit of the tire.

In order to securely hold the tire in place and also prevent creaking of the same, two sets of fastening devices are preferably employed. In one of these sets each device is in the form of a bolt 16, having a curved head 17, which is molded in the rubber, said bolt projecting from the inner face of the tire and extending through the rim, being fastened by a nut 18, threaded on said projecting end. The devices of the other set also are in the form of bolts, each one having a shank 19, which passes through the rim, the inner end of the shank carrying a head 20, the outer end having a nut 21. A washer 22 is interposed between the head and the rim, and a projection is thus formed in the channel, which is adapted to engage in one of the sockets and hold the adjacent portion of the tire against both lateral and longitudinal movement.

It will be evident that a tire constructed in accordance with the present invention can be cheaply manufactured, as it may be molded in one piece, the fastening device 16 being incorporated therewith. Moreover, when applied by extending or stretching it it will bind tightly in the channel, so as to be held against displacement, this binding action sealing the air-sockets. The fastening devices also constitute additional securing means of value in connection with the structure. By having the sockets the tire is not only made lighter, but more resilient, yielding to the impact of the surface over which the wheel travels and reassuming its original shape after leaving the same, this return being partially accomplished by the air compressed within the cells or sockets and by the rubber surrounding the same.

From the foregoing it is thought that the construction, operation, and many advantages of the herein-described invention will be apparent to those skilled in the art without further description, and it will be understood that various changes in the size, shape, proportion, and minor details of construction may be resorted to without departing from the spirit or sacrificing any of the advantages of the invention.

Having thus described my invention, what I claim as new, and desire to secure by Letters Patent, is—

In a structure of the class described, the combination with a channeled rim, of spokes passing through the rim and having their outer ends headed down upon the bottom of the channel, and an elastic tire stretched longitudinally and seated in the channel, said tire having open-ended cylindrical air-sockets extending into the same from its inner side and terminating short of the outer side, the inner open ends of said sockets being covered by the rim and certain of the same receiving the headed ends of the spokes.

In testimony that I claim the foregoing as my own I have hereto affixed my signature in the presence of two witnesses.

ORVILLE LIVINGSTON LEACH.

Witnesses:
   WM. T. PATSTONE,
   IRVING C. ATWOOD.